(12) United States Patent
Jäppinen et al.

(10) Patent No.: US 11,781,943 B2
(45) Date of Patent: Oct. 10, 2023

(54) ARRANGEMENT FOR MONITORING ANTIFRICTION BEARING OF ROTATING SHAFT OF ROTATING ELECTRIC MACHINE

(71) Applicant: ABB Schweiz AG, Baden (CH)

(72) Inventors: Jari Jäppinen, Helsinki (FI); Olli Liukkonen, Helsinki (FI); Timo Holopainen, Helsinki (FI); Markku Niemelä, Lappeenranta (FI); Ville Särkimäki, Helsinki (FI)

(73) Assignee: ABB Schweiz AG, Baden (CH)

( * ) Notice: Subject to any disclaimer, the term of this patent is extended or adjusted under 35 U.S.C. 154(b) by 165 days.

(21) Appl. No.: 16/864,208

(22) Filed: May 1, 2020

(65) Prior Publication Data
US 2020/0256763 A1 Aug. 13, 2020

Related U.S. Application Data

(63) Continuation of application No. PCT/EP2017/078198, filed on Nov. 3, 2017.

(51) Int. Cl.
*G01M 13/04* (2019.01)
*G01M 13/045* (2019.01)
(Continued)

(52) U.S. Cl.
CPC .......... *G01M 13/045* (2013.01); *F16C 19/02* (2013.01); *G01D 21/02* (2013.01); *G01J 5/02* (2013.01);
(Continued)

(58) Field of Classification Search
CPC .... G01M 13/00; G01M 13/04; G01M 13/045; F16C 19/02; F16C 2233/00; G01D 21/02; G01J 5/02; G01N 27/22; G01P 3/36
See application file for complete search history.

(56) References Cited

U.S. PATENT DOCUMENTS 3,176,286 A * 3/1965 Dschen ............... G01M 13/04
73/462
3,668,672 A * 6/1972 Parnell ................ G08C 19/10
324/660
(Continued)

FOREIGN PATENT DOCUMENTS

CN 101460771 A 6/2009
CN 101460771 B 8/2012
(Continued)

OTHER PUBLICATIONS

European Patent Office, International Search Report & Written Opinion issued in corresponding Application No. PCT/EP2017/078198, dated Jun. 27, 2018, 12 pp.
(Continued)

*Primary Examiner* — Alexander A Mercado
(74) *Attorney, Agent, or Firm* — Leydig, Voit & Mayer, Ltd.

(57) ABSTRACT

An arrangement for monitoring an antifriction bearing of a rotating shaft of a rotating electric machine. The arrangement includes: one or more capacitor electrodes to measure a capacitive shaft displacement parameter; one or more of the following additional measurement sensors; a microphone to measure a bearing noise parameter, a voltage sensor to measure a bearing current parameter, and/or an optical pyrometer to measure a shaft heat parameter; and one or more processors configured to evaluate a condition of the antifriction bearing based on the capacitive shaft displacement parameter and one or more of the following: the bearing noise parameter, the bearing current parameter, and/or the shaft heat parameter.

19 Claims, 5 Drawing Sheets

(51) Int. Cl.
*F16C 19/02* (2006.01)
*G01M 13/00* (2019.01)
*G01D 21/02* (2006.01)
*G01J 5/02* (2022.01)
*G01N 27/22* (2006.01)
*G01P 3/36* (2006.01)

(52) U.S. Cl.
CPC ............ *G01M 13/00* (2013.01); *G01N 27/22* (2013.01); *G01P 3/36* (2013.01); *F16C 2233/00* (2013.01)

(56) References Cited

U.S. PATENT DOCUMENTS

| | | | | |
|---|---|---|---|---|
| 4,694,235 | A * | 9/1987 | Flowers | H02K 11/21 |
| | | | | 318/662 |
| 4,941,105 | A * | 7/1990 | Marangoni | G01M 13/04 |
| | | | | 702/42 |
| 5,748,005 | A * | 5/1998 | McCormick | G01D 5/2417 |
| | | | | 310/90.5 |
| 6,176,622 | B1 * | 1/2001 | Nicot | F16C 41/007 |
| | | | | 324/207.25 |
| 6,339,336 | B1 * | 1/2002 | Oisugi | B23K 26/02 |
| | | | | 340/870.37 |
| 7,078,915 | B1 * | 7/2006 | Lin | G01D 5/2415 |
| | | | | 324/660 |
| 2010/0089162 | A1 | 4/2010 | Akamatsu | |
| 2011/0128530 | A1 | 6/2011 | Al-Rawi | |
| 2011/0175631 | A1 * | 7/2011 | Kretschmer | H02K 11/40 |
| | | | | 324/679 |
| 2012/0330580 | A1 | 12/2012 | Fruh et al. | |
| 2013/0049772 | A1 * | 2/2013 | Hassel | G01R 31/343 |
| | | | | 324/658 |
| 2014/0204976 | A1 | 7/2014 | Peroulis et al. | |
| 2014/0320109 | A1 * | 10/2014 | Bankestrom | G01R 19/0092 |
| | | | | 324/76.11 |
| 2015/0049970 | A1 * | 2/2015 | Carnahan | B23P 11/005 |
| | | | | 29/505 |
| 2017/0089734 | A1 * | 3/2017 | Tolsa | H05K 1/162 |
| 2017/0212008 | A1 * | 7/2017 | Higashiyama | F16C 41/004 |
| 2020/0116528 | A1 * | 4/2020 | Kobayashi | C23C 16/52 |

FOREIGN PATENT DOCUMENTS

| | | |
|---|---|---|
| CN | 202614529 U | 12/2012 |
| CN | 106353096 A | 1/2017 |
| CN | 106769043 A | 5/2017 |
| EP | 2918964 A1 | 9/2015 |
| WO | 2016157347 A1 | 10/2016 |

OTHER PUBLICATIONS

European Patent Office, International Preliminary Report on Patentability issued in corresponding Application No. PCT/EP2017/078198, dated Oct. 11, 2019, 15 pp.

De Azevedo et al., "A review of wind turbine bearing condition monitoring: State of the art and challenges," Renewable and Sustainable Energy Reviews, vol. 56, 2016, pp. 368-379.

Tchakoua et al., "Wind Turbine Condition Monitoring: State-of-the-Art Review, New Trends, and Future Challenges," Energies, 2017, vol. 7, pp. 2595-2630.

European Patent Office, Intention to Grant issued in corresponding Application No. 17797913.5, dated Nov. 20, 2020, 27 pp.

China National Intellectual Property Administration, Office Action in Counterpart Chinese Patent Application No. 201780097387.9, 16 pp. (dated Jul. 21, 2021).

Yang, "Antifriction Design for Rolling Bearings," *Bearing*, 11: 55-58 (Nov. 2013).

* cited by examiner

ARRANGEMENT FOR MONITORING ANTIFRICTION BEARING OF ROTATING SHAFT OF ROTATING ELECTRIC MACHINE

FIELD

The invention relates to an arrangement for monitoring an antifriction bearing of a rotating shaft of a rotating electric machine.

BACKGROUND

A rotating shaft is an essential part of a rotating electric machine (such as an electric motor, an electric generator, or another electromagnetic machine). The shaft is accommodated by an antifriction bearing. Condition monitoring of the antifriction bearing during use is important. In the prior art, condition monitoring is based on vibration measurements. There are two types of measurements: a bearing housing acceleration measurement, and a relative shaft displacement measurement. The acceleration measurement is applied for machines with all types of bearings, but the shaft displacement measurement is only applied for a plain bearing (or solid bearing), wherein the journal slides over the bearing surface (i.e., no antifriction bearing is used), and, hence, information related to a behaviour of a lubrication film is obtained. This means that the condition monitoring of the antifriction bearing machines is only based on the acceleration measurement, which has two shortcomings: the measurement is not applicable in a low frequency range (below 10 Hz), and the identification of the local behaviour is difficult. The acceleration measurement only yields indirect information, and no information on essential physical behaviour related to the antifriction bearing such as an oscillating bearing force based on a relative displacement and bearing stiffness, a contact angle of rolling elements, a state of contact of rolling elements around the perimeter, a tilting angle of the free-end outer ring, and a stick-slip motion of the free-end bearing.

Therefore, the condition monitoring necessitates further sophistication.

BRIEF DESCRIPTION

The present invention seeks to provide an improved arrangement for monitoring an antifriction bearing of a rotating shaft of a rotating electric machine, and an improved installation comprising the rotating electric machine, the rotating shaft, the antifriction bearing and the arrangement.

According to an aspect of the present invention, there is provided an arrangement as specified in claim 1.

According to another aspect of the present invention, there is provided an installation as specified in claim 14.

LIST OF DRAWINGS

Example embodiments of the present invention are described below, by way of example only, with reference to the accompanying drawings, in which FIG. 1 illustrates example embodiments of an arrangement for monitoring an antifriction bearing of a rotating shaft of a rotating electric machine;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
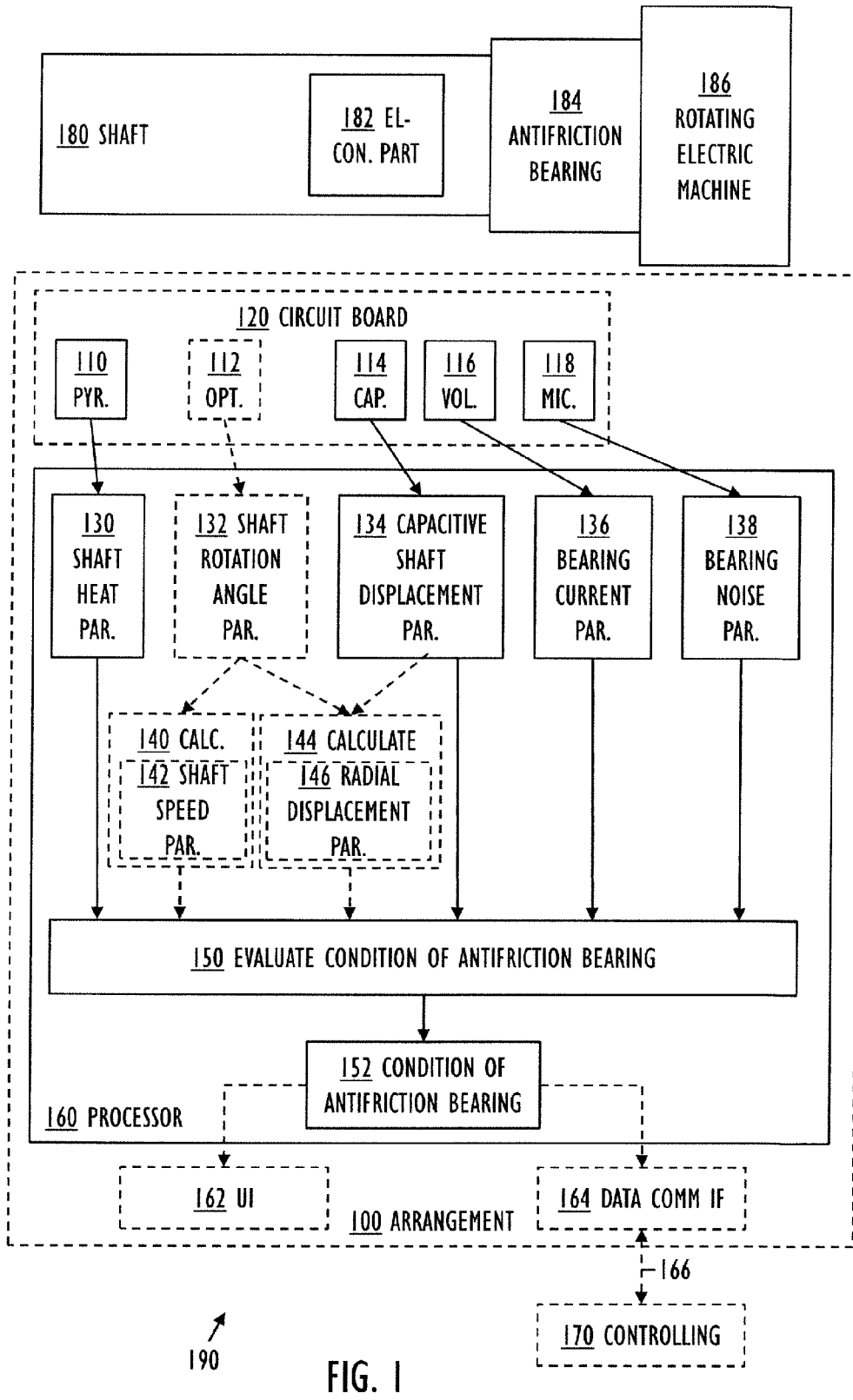

Let us study FIG. 1, which illustrates example embodiments of an arrangement 100 for monitoring an antifriction bearing 184 of a rotating shaft 180 of a rotating electric machine 186.

The arrangement 100 comprises one or more capacitor electrodes 114 configured and positioned adjacent to the antifriction bearing 184 of the rotating shaft 180 of the rotating electric machine 186 to measure a capacitive shaft displacement parameter 134 from an interaction with an electrically conducting part 182 of the rotating shaft 180.

In its simplest form, the capacitive shaft displacement parameter 134 determines a distance between the rotating shaft 180 and the one or more capacitor electrodes 114.

The arrangement 100 also comprises one or more of the following additional measurement sensors:

a microphone 118 configured and positioned adjacent to the antifriction bearing 184 to measure sound waves caused by the antifriction bearing 184 as a bearing noise parameter 138;

a voltage sensor 116 configured to measure a voltage difference between the rotating shaft 180 and a static part of the rotating electric machine 186 as a bearing current parameter 136; and/or an optical pyrometer 110 configured to measure a temperature of the rotating shaft 180 as a shaft heat parameter 130.

The arrangement also comprises one or more processors 160 configured to evaluate 150 a condition 152 of the antifriction bearing 184 based on the capacitive shaft displacement parameter 134 and one or more of the following: the bearing noise parameter 138, the bearing current parameter 136, and/or the shaft heat parameter 130.

The condition 152 of the antifriction bearing 184 may indicate a remaining lifetime expectancy of the antifriction bearing 184, or a service need, for example.

In an example embodiment, the bearing noise parameter 138 and the capacitive shaft displacement parameter 134 may be used to evaluate condition of the antifriction bearing 184 in real-time or near real-time. The measured sound waves may be analyzed with an envelope analysis, for example.

In an example embodiment, the microphone 118 is configured to measure such frequencies, which are emitted as sound and/or vibration (even out of the human hearing range), that indicate the condition 152 such as wearing of the antifriction bearing 184, for example. An excessive bearing noise (exceeding a decibel limit, or having a certain frequencies, for example) indicates that the antifriction bearing 184 is close to an end of its lifecycle or that it needs to be serviced or replaced.

With the voltage difference measurement, voltage differences between opposite ends of the rotating shaft 180 may be detected and monitored. If the voltage difference between opposite ends is considerable, it may cause harmful bearing currents decreasing lifetime of the antifriction bearing 184, if the opposite ends are electrically connected through a circuit formed by the frame of the rotating electric machine 186. Electrical bearing currents may cause pitting and excessive bearing noise, fluting, and finally even a motor failure.

In an example embodiment, high-frequency voltage is fed to to a capacitance circuit formed by the rotating shaft 180 and the one or more capacitor electrodes 114 in order to measure the capacitive shaft displacement parameter 134, whereas the voltage difference is measured between the rotating shaft 180 and a static part of the rotating electric machine 186 such as a frame of the rotating electric machine 186 or a shield of the antifriction bearing 184.

The optical pyrometer 110 determines from a distance the temperature of a surface of the rotating shaft 180 from a spectrum of the thermal radiation the surface emits. It has bee found out that the capacitive shaft displacement parameter 134 together with the shaft heat parameter 130 indicates well the remaining lifetime of the antifriction bearing 184. For example, if the displacement exceeds a predetermined threshold and the temperature is over a certain limit, it may de deduced that the antifriction bearing 184 is worn beyond an acceptable limit.

In an example embodiment, a circuit board 120 may comprise the one or more processors 160 to process the measured data from the sensors 110, 114, 116, 118. However, the one or more processors 160 may be located near the circuit board 120, in the same housing or in a separate housing, or even at a greater distance, such as in a server or a computing cloud, for example.

The communication between these different actors may be implemented with appropriate wired/wireless communication technologies and standard/proprietary protocols.

In an example embodiment, the wired communication is implemented with a suitable communication technology utilizing coaxial cable, twisted pair or fibre optic, and LAN (Local Area Network) or the Ethernet, for example.

In an example embodiment, the wireless communication is implemented with a suitable cellular communication technology such as GSM, GPRS, EGPRS, WCDMA, UMTS, 3GPP, IMT, LTE, LTE-A, or with a suitable non-cellular communication technology such as Bluetooth, Bluetooth Low Energy, Wi-Fi, WLAN (Wireless Local Area Network).

The term 'processor' 160 refers to a device that is capable of processing data. Depending on the processing power needed, one or more processors 160 may be used such as parallel processors or a multicore processor(s).

The one or more processors 160 also use 'memory', which refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The one or more processors 160 and the memory may be implemented by an electronic circuitry. A non-exhaustive list of implementation techniques for the one or more processors 160 and the memory includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The processing may be implemented with computer program code in a form of software and/or hardware. In an example embodiment, the software may be written by a suitable programming language (a high-level programming language, such as C, C++, or Java, or a low-level programming language, such as a machine language, or an assembler, for example), and the resulting executable code may be stored on the memory and run by the one or more processors 160. In an alternative example embodiment, the functionality of the hardware may be designed by a suitable hardware description language (such as Verilog or VHDL), and transformed into a gate-level netlist (describing standard cells and the electrical connections between them), and after further phases the chip implementing the one or more processors 160, memory and the code may be fabricated with photo masks describing the circuitry.

In an example embodiment, the arrangement 100 further comprises a user interface 162 configured to output the condition 152 of the antifriction bearing 184.

In an example embodiment, the arrangement 100 further comprises a data communication interface 164 configured to communicate the condition 152 of the antifriction bearing 184. The data communication interface 164 may be implemented with the above-described appropriate wired/wireless communication technologies and standard/proprietary protocols. The data communication interface 164 may implement a simplex or a duplex connection 166 with an external controlling apparatus 170, such as as control centre, an operations and maintenance centre, a service centre, or the like.

In an example embodiment an installation 190 comprises the rotating electric machine 186, the rotating shaft 180, the antifriction bearing 184 and the arrangement 100. Such an installation 190 may be in a factory, power plant, vessel, or in another site, wherein rotating electric machines 186 are used.

Another patent application by the applicant, published as EP 2918964, is incorporated herein by reference in all jurisdictions where applicable. It may be consulted in order to find a further enabling disclosure, especially for the capacitor electrodes 114 and their use for measuring the capacitive displacement parameter. The present application describes an enhanced measurement arrangement, bringing forward advantages in installation ease, integration, sensor costs and measurement accuracy.

Figure 2A:
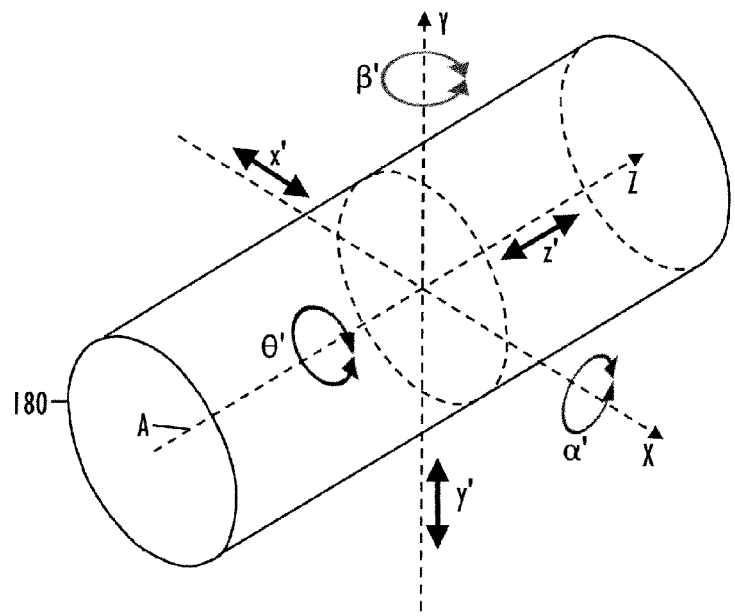
FIG. 2A illustrates example embodiments of a rotating shaft.
Figure 2B:
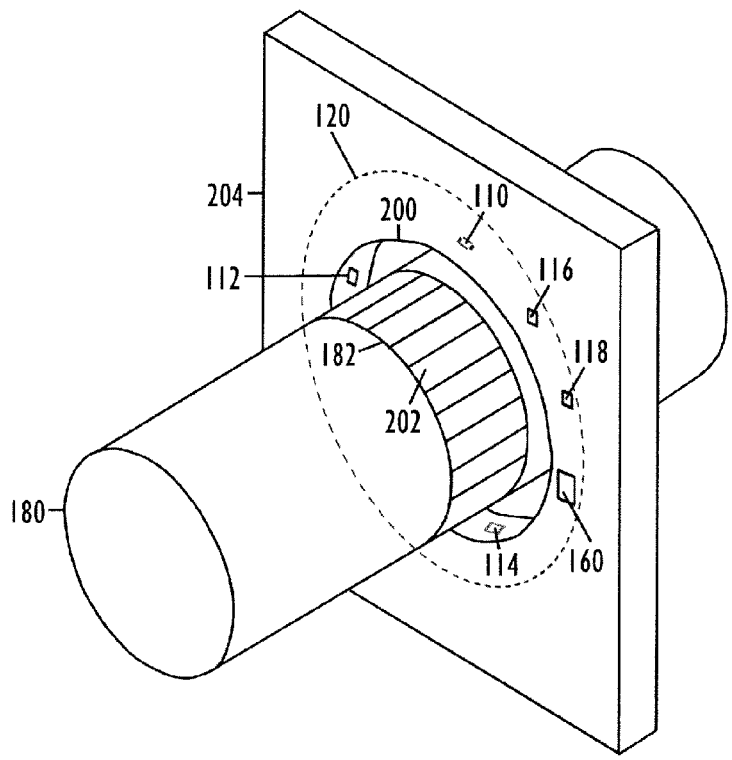
FIG. 2B illustrates example embodiments of a circuit board.

In an example embodiment illustrated in FIGS. 1 and 2B, the arrangement 100 further comprises an optical pulse sensor 112 configured and positioned adjacent to the antifriction bearing 184 to measure a rotation angle of the rotating shaft 180 as a shaft rotation angle parameter 132.

The one or more processors 160 are further configured to calculate 144 a radial displacement parameter 146 of the rotating shaft 180 as a function of the rotation angle based on the shaft rotation angle parameter 132 and the capacitive shaft displacement parameter 134. The one or more processors 160 are further configured to evaluate 150 the condition 152 of the antifriction bearing 184 also based on the radial displacement parameter 146 indicating bending of the rotating shaft 180.

In an example embodiment illustrated in FIG. 2B, the rotating shaft 180 comprises a suitable counterpart surface 202 for the optical pulse sensor 112 so that the rotation angle may be measured. The counterpart surface 202 may be machined into the surface of the rotating shaft 180, or attached as a coating or a ring-like part on the rotating shaft 180, for example.

In an example embodiment, the one or more processors 160 are further configured to calculate 140 an integration (=mathematical calculus operation) of the rotation angle as a function of time in order to get a rotation speed of the rotating shaft 180 as a shaft speed parameter 142. The one or more processors 160 are further configured to evaluate 150 the condition 152 of the antifriction bearing 184 also based on the shaft speed parameter 142.

As shown in FIG. 2A, the rotating shaft 180 may move in six degrees of freedom: move along X, Y and Z axes, and rotate around these axes. The translations (or movements or displacements, or rotations) of the rotating shaft 180 are marked as x' (axial displacement), y' (axial displacement) and z' (radial displacement), and α' (rotation around x-axis), β' (rotation around y-axis), and 0' (rotation around z-axis). In an example embodiment, these translations are detected by the one or more capacitor electrodes 114 as the capacitive shaft displacement parameter 134.

In an example embodiment, the rotating shaft 100 is a metal shaft of a rotor of the rotating electric machine 186 (such as an electric motor, electric generator, or another electromagnetic machine).

Figure 4A:
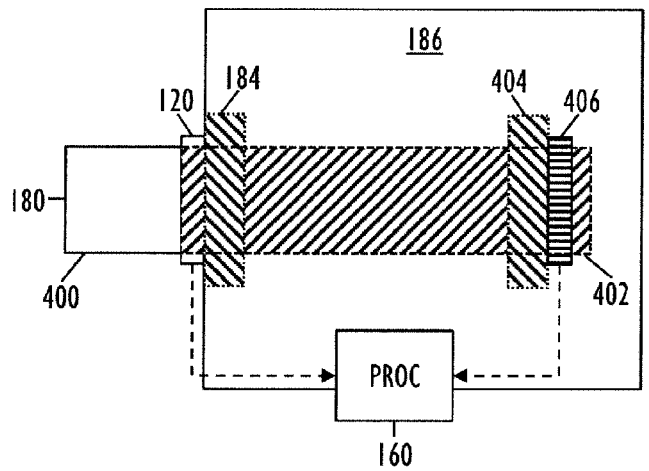
FIGS. 4A and 4B illustrate further example embodiments of the arrangement.

The rotating shaft 180 has two ends, a driving end (D) 400, wherefrom power is outputted, and a non-driving end (N) 402, see FIG. 4A.

In an example embodiment, the rotating shaft 100 is of a cylindrical shape with a centre axis A. In FIG. 2A, the Cartesian coordinate system is arranged so that the z-axis coincides with the centre axis A, and x- and y-axes are perpendicular to z-axis and to each other.

Let us next study FIG. 1 and FIG. 2B. In an example embodiment, the one or more capacitor electrodes 114 and the one or more additional measurement sensors 110, 112, 116, 118 are placed on the circuit board 120, which is configured and positioned adjacent to the antifriction bearing 184 and the rotating shaft 180. The circuit board 120 may gave been machined from a circuit board blank 204. In an example embodiment, the circuit board 120 is rigid, such as a printed circuit board.

In an example embodiment shown in FIG. 2B, also the one or more processors 160 are placed on the circuit board 120.

Figure 3A:
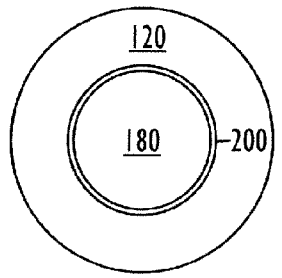
FIGS. 3A, 3B and 3C illustrate further example embodiments of the circuit board.

In an example embodiment shown in FIGS. 2B and 3A, the circuit board 120 comprises an arched shape 200 configured and positioned adjacent to the antifriction bearing 184 and dimensioned and configured to receive the electrically conducting part 182 of the rotating shaft 180. In an example embodiment, the arched shape 200 is implemented as a mounting hole in the circuit board 120. Such an arched shape 200 is configured and dimensioned to receive the rotating shaft 180 with a desired fitting tolerance.

Figure 3B:
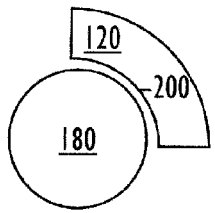

In an example embodiment illustrated in FIG. 3B, the arched shape 200 comprises a partial circle of at least 90 degrees extending perpendicularly through the circuit board 120 to receive the electrically conducting part 182 of the rotating shaft 180. With such a partial circle, the placing of the rigid circuit board 120 adjacent to the rotating shaft 180 is simplified (as the rotating shaft 180 need not be able to be pushed through a mounting hole, for example).

Figure 3C:
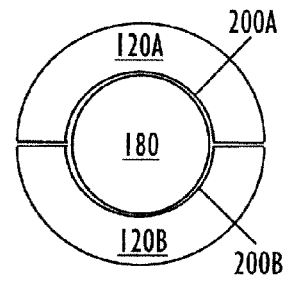

In an example embodiment illustrated in FIG. 3C, the circuit board 120 comprises two parts 120A, 120B, which are configured to be separable so as to be placeable around the electrically conducting part 182 of the rotating shaft 180 and attachable to each other thereafter. Such a structure eases placing of the circuit board 120 adjacent to the rotating shaft 180 as well, during manufacturing or maintenance, for example.

Although Figures do not illustrate it, the circuit board 120 is, naturally, fixed adjacent to the rotating shaft 180. This may be implemented by attaching the circuit board 120 by suitable fixing means (such as glue, screws, rack, bracket, stand, support, etc.) to the rotating electric machine 186 or to a suitable location nearby (such as floor, wall, etc.). Furthermore, the circuit board 120 may be protected by a suitable housing (made of metal, plastic, and/or composite), which may be waterproof and/or dustproof. A suitable electric energy source, such as a mains connection or a battery may be placed in the housing as well.

As shown in FIG. 2A, the circuit board 200 comprises the one or more capacitor electrodes 114 configured and positioned adjacent to the arched shape 202. The electrically conducting 182 part of the rotating shaft 180 may be achieved by a special coating or material mixture, or, naturally, the whole rotating shaft 180 may be electrically conducting (as it is made of metal).

In an example embodiment, the arched shape 200 comprises a via in the circuit board. The via, also known as a vertical interconnect access, is an electrical connection between layers of the circuit board 120 going through the plane of the one or more adjacent layers. In an example embodiment, the via comprises a barrel, which is a conductive tube filling the hole, or a conductive edge adjacent to the arched shape 200. The conductivity is achieved by electroplating or attaching a lining (such as a tube or a rivet).

Figure 4B:
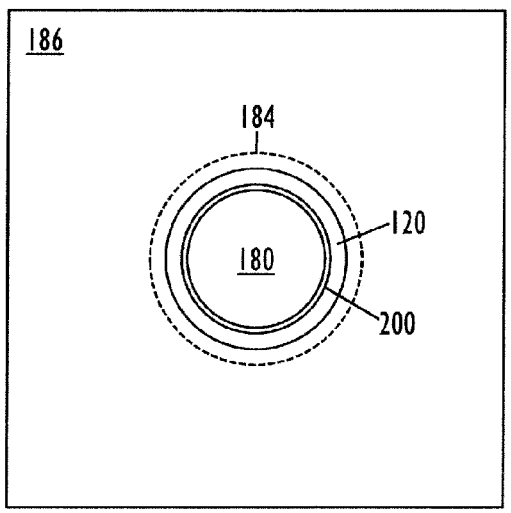

As shown in FIGS. 4A and 4B, the measurement points of the arrangement 100 may be placed adjacent to more than one antifriction bearings 184, 404. In an example embodiment, two circuit boards 120, 406 are placed adjacent to the antifriction bearings 184, 404. In an example embodiment, these circuit board 120, 406, and antifriction bearing 184, 404-pairs are located at the driving end 400 and at the non-driving end 402. A voltage difference between the opposite ends 400, 404 may also be monitored.

In a further example embodiment, a number of arrangements 100 may be placed along the axis A of the rotating shaft 180, whereby harmful torsional vibration of the rotating shaft 180 may be detected and monitored.

Also, if mechanical characteristics of the rotating shaft 180 are known, a torque affecting the rotating shaft 180 may be calculated based on different measured (by each arrangement 100) rotation angles.

The main function of the antifriction bearing 184, 404 is to provide rotational motion between the rotating shaft 180 (also known as a rotor) and a stator in the rotating electric machine 186. Naturally, the antifriction bearing 184, 404 carries the weight of the rotating shaft 180 and transmits external forces in radial and axial directions, see FIG. 5. The antifriction bearing design needs also to take into account changing thermal conditions: as shown in FIG. 6, a free-end clearance between an outer race 502 and a housing 600 together with preloaded axial springs 602 takes care of this.

The antifriction bearing 184 comprises an inner race 504 (also known as an inner ring), an outer race 502 (also known as an outer ring), rolling elements 500, and a housing 600 (also known as a cage).

The inner race 504 of the antifriction bearing 184 is configured and dimensioned to receive the rotating shaft 180 of the rotating electric machine 186.

In an example embodiment, the inner race 504 is interference-fitted onto the rotating shaft 180. In an example embodiment, the outer race 502 is location clearance-fitted to the housing 600 in the driving end (or axially locked end) 400. In an example embodiment, the outer race 502 is clearance-fitted to the housing 600 in the non-driving end (or axially free end) 402.

Figure 5:
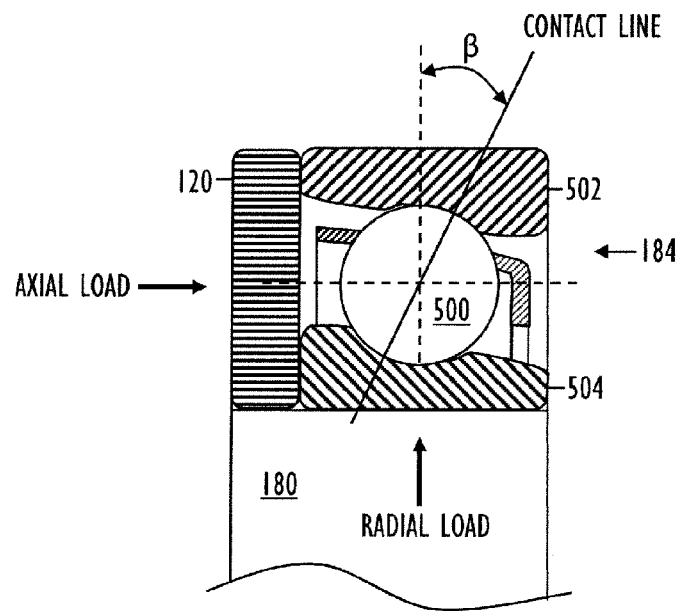
FIG. 5 illustrates an example embodiment of an angular contact ball bearing.
Figure 6:
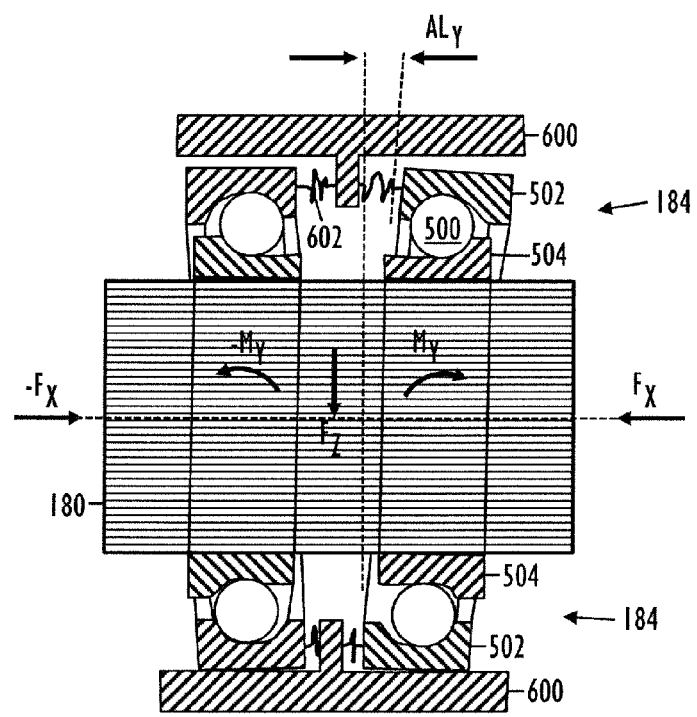
FIG. 6 illustrates an example embodiment of an outer ring tilting.

FIG. 5 illustrates an angular (angle β) contact ball bearing 402, and FIG. 6 illustrates a mechanism enabling an outer race tilting.

As shown in FIG. 6, the antifriction bearing 184 is subjected to an axial load along the X axis and a radial load along the Z axis, which produces a moment My about the Y axis, and the outer race 502 attempts to tilt against the restraint (by the preloaded spring) of the mounting.

Let us next study FIGS. 7, 8, 9, 10 and 11 illustrating various example embodiments of the arrangement 100.

One or more capacitor electrodes 114A, 114B are configured and positioned adjacent to the inner race 504.

Figure 7:
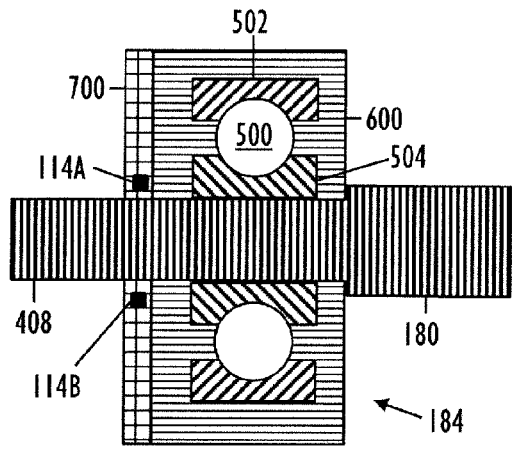
FIGS. 7, 8, 9, 10 and 11 illustrate further example embodiments of the arrangement.
Figure 8:
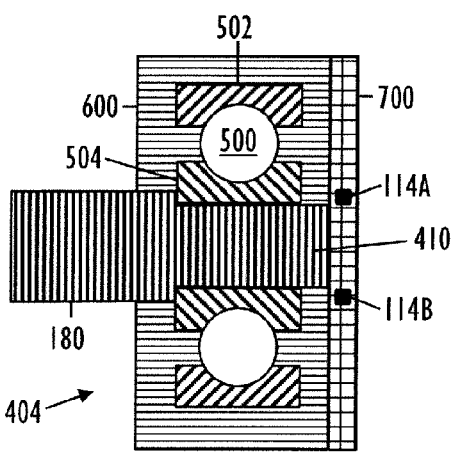

In an example embodiment illustrated in FIG. 7, the one or more capacitor electrodes 114A, 114B are configured and positioned in a front cover 700 of the antifriction bearing 184, and the capacitive shaft displacement parameter 134 is measured between the rotating shaft 180 and the front cover 700. FIG. 7 illustrates this arrangement for the driving end 400 of the rotating shaft 180, whereas FIG. 8 illustrates the arrangement for the non-driving end 402 of the rotating shaft 180. The relative radial position changes due to operation conditions such as speed, temperature, outer-ring tilting angle, free-end motion etc. The radial displacement parameter 146 is directly proportional to the transmitted radial bearing force, which may be assessed by using a stiffness matrix of the antifriction bearing 184, 404.

Figure 9:
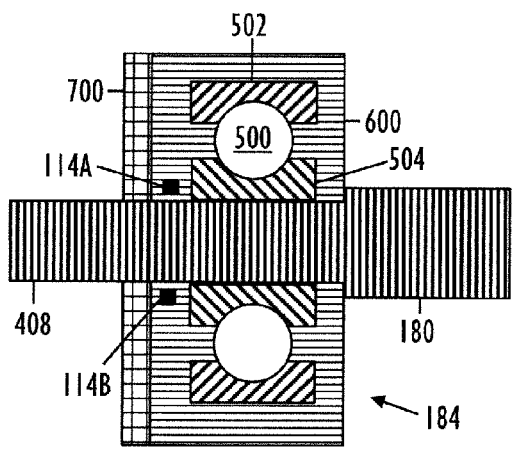
Figure 10:
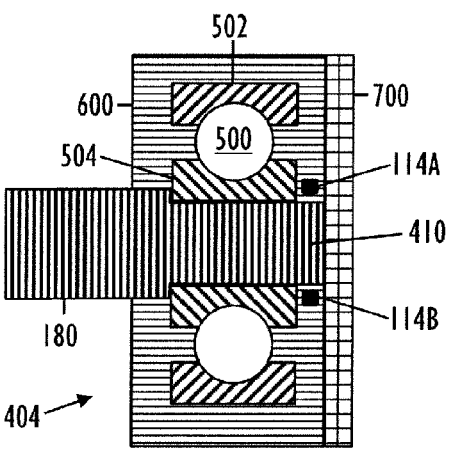

In an example embodiment illustrated in FIG. 9, the one or more capacitor electrodes 114A, 114B are configured and positioned in a housing 600 of the antifriction bearing 184, and the capacitive shaft displacement parameter 134 is measured between the rotating shaft 180 and the housing 600. FIG. 9 illustrates this arrangement for the driving end 400 of the rotating shaft 180, whereas FIG. 10 illustrates the arrangement for the non-driving end 402 of the rotating shaft 180.

The circuit board 120 may be placed in the front cover 700 or in the housing 600. Furthermore, the circuit board 120 may be protected by a suitable housing (made of metal, plastic, and/or composite), which may be waterproof and/or dustproof. A suitable electric energy source, such as a mains connection or a battery may be placed in the front cover 700 or housing 600 as well.

Figure 11:
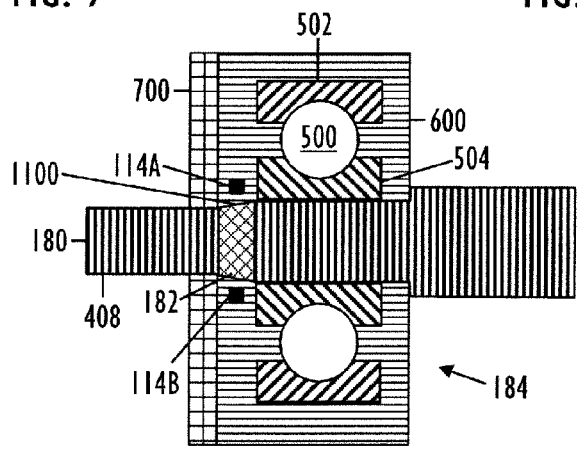

In an example embodiment illustrated in FIG. 11, the one or more capacitor electrodes 114 are configured and positioned (adjacent to the inner race 504, for example) to measure two radial displacement components and one axial displacement component as the capacitive shaft displacement parameter 134 utilizing a conical part 1100 of the electrically conducting part 182 of the rotating shaft 180.

The conical part 1100 may be implemented by machining it into the rotating shaft 100.

Thus, in addition to the radial displacement components, an axial displacement component may be detected. This may give a better picture of bearing behaviour in different operating conditions. In free-end, the relative axial displacement component indicates the motion of the antifriction bearing 404. By combining axial displacement components of the both ends 400, 402, the variation of the of the relative length of the rotating shaft 180 with respect to the machine 186 frame may also be identified.

It will be obvious to a person skilled in the art that, as technology advances, the inventive concept can be implemented in various ways. The invention and its embodiments are not limited to the example embodiments described above but may vary within the scope of the claims.

The invention claimed is:

1. An arrangement for monitoring an antifriction bearing of a rotating shaft of a rotating electric machine comprising:
   a circuit board communicatively coupled to one or more processors, which is configured and positioned adjacent to the antifriction bearing and the rotating shaft, one or more capacitor electrodes being placed on the circuit board and configured and positioned adjacent to the antifriction bearing of the rotating shaft of the rotating electric machine to measure a capacitive shaft displacement parameter from an interaction with an electrically conducting part of the rotating shaft, determining, by the one or more processors, a distance between the rotating shaft and the one or more capacitor electrodes based on the capacitive shaft displacement parameter, wherein voltage is fed to a capacitance circuit formed by the rotating shaft and the one or more capacitor electrodes in order to measure the capacitive shaft displacement parameter, and an optical pyrometer configured to measure a temperature of the rotating shaft as a shaft heat parameter; and
   the one or more processors, communicating with sensors placed on the circuit board, and configured to evaluate whether the antifriction bearing is worn beyond an acceptable limit based on the capacitive shaft displacement parameter and the shaft heat parameter.

2. The arrangement of claim 1, further comprising an optical pulse sensor configured and positioned adjacent to the antifriction bearing to measure a rotation angle of the rotating shaft as a shaft rotation angle parameter, and the one or more processors are further configured to calculate a radial displacement parameter of the rotating shaft as a function of the rotation angle based on the shaft rotation angle parameter and the capacitive shaft displacement parameter, and the one or more processors are further configured to evaluate whether the antifriction bearing requires service based on the radial displacement parameter indicating bending of the rotating shaft.

3. The arrangement of claim 2, wherein the one or more processors are further configured to calculate an integration of the rotation angle as a function of time in order to get a rotation speed of the rotating shaft a shaft speed parameter, and the one or more processors are further configured to evaluate whether the antifriction bearing requires service based on the shaft speed parameter.

4. The arrangement of claim 3, wherein the one or more capacitor electrodes are configured and positioned to measure two radial displacement components and one axial displacement component as the capacitive shaft displacement parameter utilizing a conical part of the electrically conducting part of the rotating shaft.

5. The arrangement of claim 1, wherein the circuit board comprises an arched shape configured and positioned adjacent to the antifriction bearing and dimensioned and configured to receive the electrically conducting part of the rotating shaft.

6. The arrangement of claim 5, wherein the arched shape comprises a partial circle of at least 90 degrees extending perpendicularly through the circuit board to receive the electrically conducting part of the rotating shaft.

7. The arrangement of claim 6, wherein the circuit board comprises two parts, which are configured to be separable so as to be placeable around the electrically conducting part of the rotating shaft and attachable to each other thereafter.

8. The arrangement of claim 5, wherein the circuit board comprises two parts, which are configured to be separable so as to be placeable around the electrically conducting part of the rotating shaft and attachable to each other thereafter.

9. The arrangement of claim 1, wherein the antifriction bearing comprises an inner race to receive the rotating shaft, and the one or more capacitor electrodes are configured and positioned adjacent to the inner race.

10. The arrangement of claim 9, wherein the one or more capacitor electrodes are configured and positioned in a front cover of the antifriction bearing, and the capacitive shaft displacement parameter is measured between the rotating shaft and the front cover.

11. The arrangement of claim 10, wherein the one or more capacitor electrodes are configured and positioned in a housing of the antifriction bearing, and the capacitive shaft displacement parameter is measured between the rotating shaft and the housing.

12. The arrangement of claim 2, further comprising a user interface configured to output whether the antifriction bearing requires service.

13. The arrangement of claim 12, further comprising a data communication interface configured to communicate whether the antifriction bearing requires service.

14. The arrangement of claim 1, further comprising one or more of the following additional measurement sensors being placed on the circuit board: a microphone configured and positioned adjacent to the antifriction bearing to measure sound waves caused by the antifriction bearing as a bearing noise parameter; and the one or more processors, communicating with sensors placed on the circuit board, and configured to evaluate whether the antifriction bearing should be replaced based on the bearing noise parameter.

15. The arrangement of 1, wherein the one or more capacitor electrodes are configured and positioned to measure two radial displacement components and one axial displacement component as the capacitive shaft displacement parameter utilizing a conical part of the electrically conducting part of the rotating shaft.

16. The arrangement of claim 1, wherein the one or more capacitor electrodes are configured and positioned in a front cover of the antifriction bearing, and the capacitive shaft displacement parameter is measured between the rotating shaft and the front cover.

17. The arrangement of claim 1, wherein the one or more capacitor electrodes are configured and positioned in a housing of the antifriction bearing, and the capacitive shaft displacement parameter is measured between the rotating shaft and the housing.

18. The arrangement of claim 1, the one or more processors are further configured to evaluate a service need of the antifriction bearing of the antifriction bearing based on the capacitive shaft displacement parameter and the bearing shaft heat parameter.

19. The arrangement of claim 1, further comprising one or more of the following additional measurement sensors being placed on the circuit board: a voltage sensor configured to measure a voltage difference between the rotating shaft and a static part of the rotating electric machine as a bearing current parameter; and the one or more processors, communicating with sensors placed on the circuit board, and configured to evaluate whether the lifespan of the antifriction bearing is reduced based on the bearing current parameter.

* * * * *